(12) United States Patent
Yamazaki

(10) Patent No.: US 6,597,072 B2
(45) Date of Patent: Jul. 22, 2003

(54) SYSTEM AND METHOD FOR CHARGING A HIGH VOLTAGE BUS WITHIN A HYBRID ELECTRIC VEHICLE

(75) Inventor: Mark Steven Yamazaki, Canton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 85 days.

(21) Appl. No.: 09/851,671

(22) Filed: May 9, 2001

(65) Prior Publication Data

US 2002/0167223 A1 Nov. 14, 2002

(51) Int. Cl.[7] .................................................. B60L 1/00
(52) U.S. Cl. ........................................ 307/9.1; 180/62.5
(58) Field of Search ........................... 307/9.1, 116, 115; 180/165, 65.2; 320/104

(56) References Cited

U.S. PATENT DOCUMENTS

| | | | | |
|---|---|---|---|---|
| 3,631,332 A | * | 12/1971 | Williamson | 363/173 |
| 5,804,973 A | * | 9/1998 | Shinohara et al. | 324/537 |
| 5,938,708 A | * | 8/1999 | Wallace et al. | 701/45 |
| 6,002,221 A | * | 12/1999 | Ochiai et al. | 318/139 |
| 6,321,143 B1 | * | 11/2001 | Phillips et al. | 180/165 |
| 6,329,772 B1 | * | 12/2001 | Ochiai et al. | 123/335 |
| 6,333,612 B1 | * | 12/2001 | Suzuki et al. | 180/165 |
| 6,422,331 B1 | * | 7/2002 | Ochiai et al. | 180/65.2 |

FOREIGN PATENT DOCUMENTS

| | | |
|---|---|---|
| JP | 2001 128305 A | 5/2001 |
| JP | 2001 128379 A | 5/2001 |

\* cited by examiner

*Primary Examiner*—Brian Sircus
*Assistant Examiner*—Sharon A. Polk
(74) *Attorney, Agent, or Firm*—Ford Global Technologies L.L.C.

(57) ABSTRACT

A system 10 for charging a high voltage bus 12 within a vehicle 14 including one or more sources of electrical power 16 which provide electrical power to the vehicle 14. System 10 includes a controller 18, a pre-charge contactor 20 and pre-charge resistor 22, a main contactor 24, and a bus voltage sensor 26. Pre-charge contactor 20 and main contactor 24 are each respectively and communicatively coupled to controller 18 by use of electrical buses 28, 30, and sensor 26 is communicatively coupled to controller 18 by use of electrical bus 32. Controller 18 calculates the voltage and change in voltage over time of bus 12 and uses these values within a state machine strategy 50 to close contactors 20, 24, thereby charging high voltage bus 12.

16 Claims, 3 Drawing Sheets

SYSTEM AND METHOD FOR CHARGING A HIGH VOLTAGE BUS WITHIN A HYBRID ELECTRIC VEHICLE

FIELD OF THE INVENTION

This invention relates to a system and method for charging a high voltage bus within a hybrid electric vehicle and more particularly, to a system and method which utilizes a state machine algorithm to control the high voltage contactors within a hybrid electric vehicle and which allows for a relatively rapid and smooth charging of the vehicle's high voltage bus.

BACKGROUND OF THE INVENTION

Hybrid electric vehicles ("HEVs") utilize both an internal combustion engine and one or more electric motors to generate power and torque. The electric motors are powered by a source of electrical power, such as one or more batteries or fuel cells. A high voltage bus is used to carry current from the source of electrical power to the electric motor(s) and to other high voltage subsystems and components. Connection of the high voltage bus to the source of electrical power is achieved through several relays or contactors which are controlled by a vehicle system controller.

Particularly, a pre-charge contactor is used to connect the bus to the battery through a resistor, which charges the bus up to the full battery voltage while charging the motor storage capacitors. When "pre-charging" is complete, the main current-carrying contactors are closed, which causes a voltage ripple in the bus due to the current draw from the high voltage subsystem components. When the bus voltage becomes stable, the high voltage subsystem is declared operational and the vehicle may be operated. It is desirable to charge the high voltage bus as fast as possible without risking damage to the system or any of its components, so that the vehicle may be operational without any significant or unnecessary delay. While prior bus-charging strategies are effective to fully charge the high voltage bus, they do not always charge the bus in the most rapid or efficient manner. Additionally, these prior strategies do not always accurately determine of the point in time when the high voltage bus within a hybrid electric vehicle becomes stable and capable of powering the high voltage vehicle components. As a result, these prior strategies do not allow the vehicle to be operational in the shortest amount of time possible.

There is therefore a need for a system and method for charging a high voltage bus within a hybrid electric vehicle which allows for the high voltage bus to be fully charged in a relatively rapid and efficient manner without any significant or unnecessary delay.

SUMMARY OF THE INVENTION

A first non-limiting advantage of the present invention is that it allows for an accurate and timely determination of the point of time when the high voltage bus within a hybrid electric vehicle becomes stable and capable of powering the high voltage vehicle components.

A second non-limiting advantage of the present invention is that it allows for the determination of error conditions within the bus-charging process by indicating when the monitored charging sequence differs significantly from the expected charging sequence.

A third non-limiting advantage of the invention is that it provides a system and method for charging a high voltage bus within a hybrid electric vehicle which reduces the overall time required for the high voltage subsystem to become operational.

According to a first aspect of the present invention, a system is provided for charging a high voltage bus within a vehicle. The system includes a source of electrical power; a pre-charge contactor which is coupled to the source of electrical power and to the high voltage bus, and which is effective to selectively and operatively connect the high voltage bus to the source of electrical power; a main contactor which is coupled to the source of electrical power and to the high voltage bus, and which is effective to selectively and operatively connect the high voltage bus to the source of electrical power; a voltage sensor which is effective to measure a voltage of the high voltage bus and to generate signals in response to the measured voltage; and a controller which is communicatively coupled to the pre-charge contactor, to the main contactor and to the voltage sensor, the controller being effective to receive the signals and to use the signals to calculate the voltage of the high voltage bus and the change in voltage over time of the high voltage bus, the controller being further effective to utilize the calculated voltage and change in voltage over time within a state machine strategy to close the pre-charge contactor and the main contactor, thereby selectively charging the high voltage bus.

According to a second aspect of the present invention, a method is provided for charging a high voltage bus within a vehicle including a source of electrical power and a pre-charge contactor and a main contactor which selectively connect the source of electrical power to the high voltage bus. The method includes the steps of monitoring the voltage of the high voltage bus; monitoring the change in voltage over time of the high voltage bus; and using the monitored voltage and the monitored change in voltage over time within a state machine strategy to determine when to close the pre-charge contactor and the main contactor.

Further objects, features, and advantages of the invention will become apparent from the following detailed description of the preferred embodiment of the invention and by reference to the following drawings.

DETAILED DESCRIPTION OF THE PREFERRED EMBODIMENT OF THE INVENTION

Figure 1:
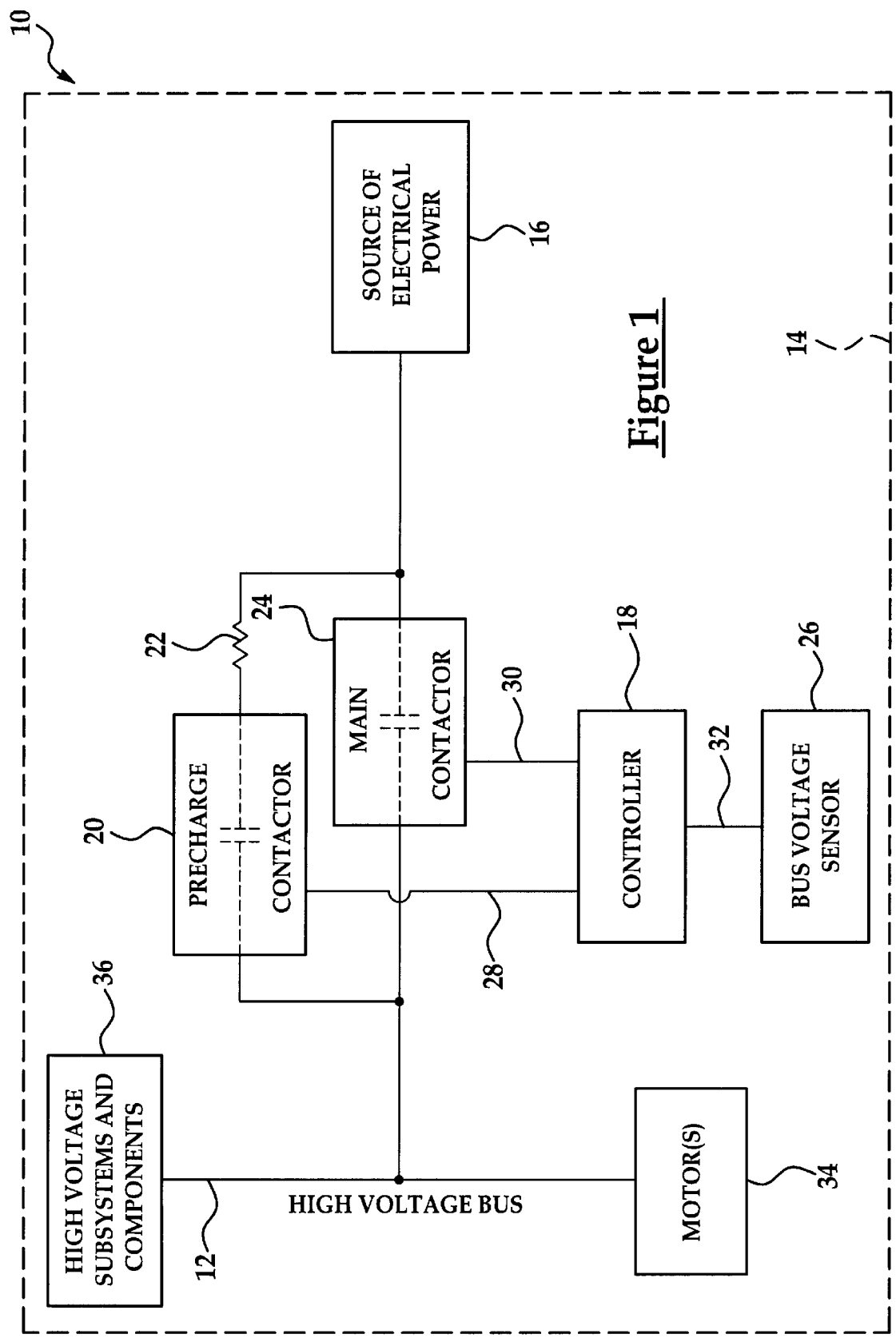
FIG. 1 is a block diagram of a system which is made in accordance with the teachings of the preferred embodiment of the invention and which is being used to charge the high voltage bus of a vehicle.

Referring now to FIG. 1, there is shown a block diagram of a system 10, which is made in accordance with the teachings of the preferred embodiment of the invention, and which is effective to efficiently and rapidly charge a high voltage bus 12 within a vehicle 14. System 10 is adapted for use in combination with a vehicle 14 including one or more sources of electrical power 16 which provide electrical power to the vehicle 14. In the preferred embodiment, vehicle 14 is a hybrid-electric or electric vehicle.

System 10 includes a controller 18, a pre-charge contactor 20 and pre-charge resistor 22, a main contactor 24, and a bus voltage sensor 26. Pre-charge contactor 20 and main contactor 24 are each respectively and communicatively coupled to controller 18 by use of electrical buses 28, 30, and sensor 26 is communicatively coupled to controller 18 by use of electrical bus 32. Vehicle 14 further includes one or more electrical motors 34 and high voltage subsystems and components 36 which are each coupled to and receive electrical power from high voltage bus 12.

High voltage bus 12 is a conventional high voltage bus including one or more storage capacitors (not shown). Source of electrical power 16 includes one or more conventional electrical power-generating devices such as fuel cells or batteries. In the preferred embodiment, controller 18 is a conventional microprocessor-based controller and in one non-limiting embodiment, controller 18 comprises a portion of a conventional vehicle system controller ("VSC").

Pre-charge contactor 20 is operatively coupled to battery 16 and bus 12 and includes one or more conventional electronically-controlled contactors or switches (e.g., relays) which operate in response to signals received from controller 18 and which allow battery 16 to be selectively and operatively connected to high voltage bus 12, effective to pre-charge the bus 12. Resistor 22 is a conventional pre-charge resistor having a relatively large resistance value. Main contactor 24 is operatively coupled to battery 16 and bus 12 and includes one or more conventional electronically-controlled contactors or switches (e.g., relays) which operate in response to signals received from controller 18 and which allow battery 16 to be selectively and operatively connected to high voltage bus 12, effective to charge the bus and to deliver power to motor 34 and subsystems and components 36. As illustrated in FIG. 1, contactors 20 and 24 are disposed in a parallel relationship to one another. While "single" contactors or switches are shown in FIG. 1, it should be appreciated that each contactor 20, 24 may actually include several different switches or relays which cooperate to perform the necessary connection between battery 16 and high voltage bus 12.

Sensor 26 includes one or more conventional and commercially available voltage sensors which measure and/or estimate the voltage of bus 12. Sensor 26 measures and/or estimates this voltage and communicates signals representing the measured and/or estimated voltage values to controller 18 which uses the signals to estimate the voltage of bus 12, to calculate the change in voltage over time of bus 12 and to use these values to operate contactors 28, 30 in a desired manner.

The electric motor 34 is one or more conventional electric motors which receive electrical power from battery 16 and which convert the electrical power into torque and power for driving the vehicle 14 (e.g., for rotatably driving the vehicle's driveshaft(s) and/or wheels). High voltage subsystems and components 36 include conventional vehicle subsystems and components which operate through high voltage electrical power received from bus 12.

Figure 2:
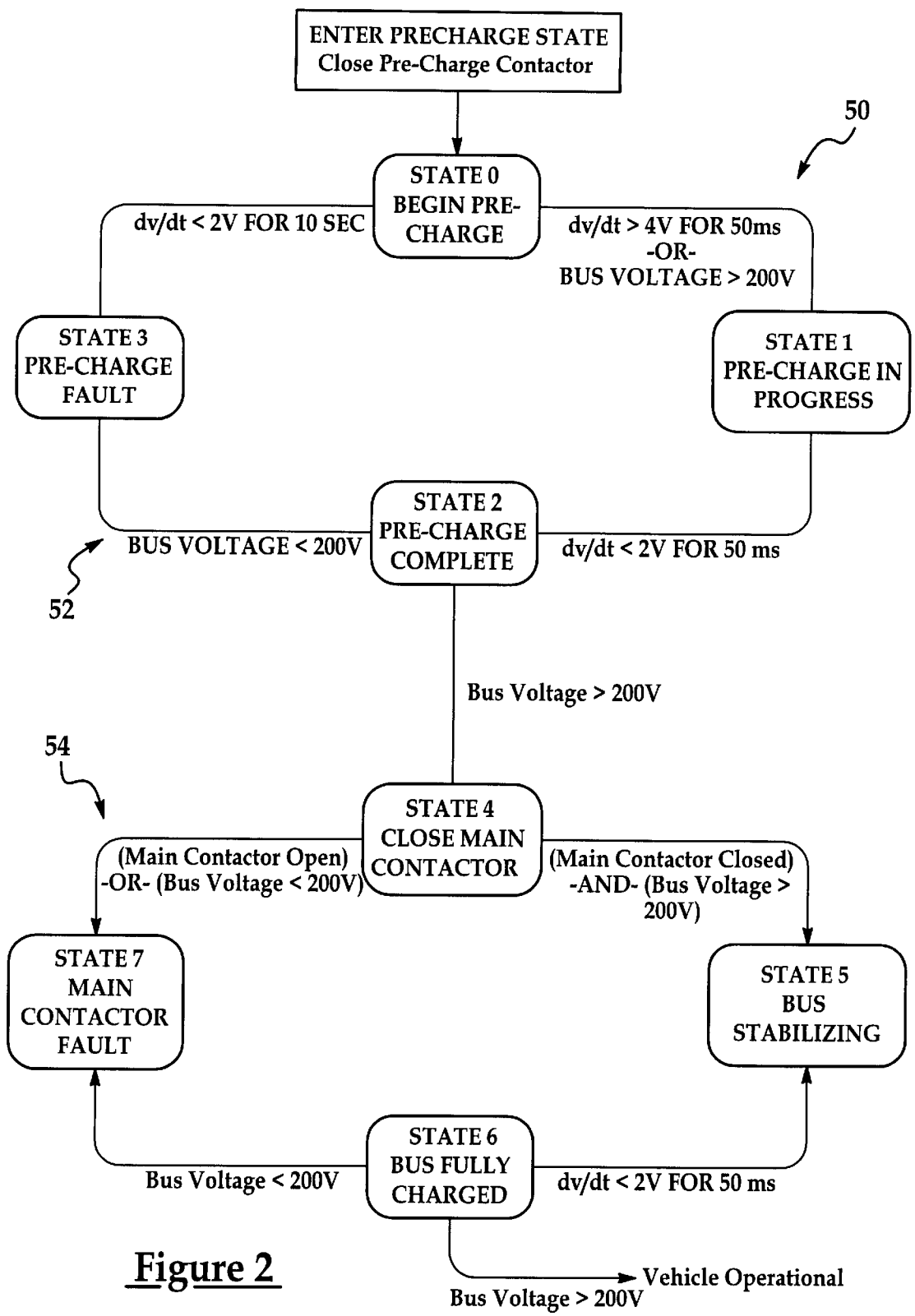
FIG. 2 is a state diagram illustrating the contactor-closing strategy used by the system shown in FIG. 1 for charging the vehicle's high voltage bus.

In operation, controller 18 controls the closing of contactors 20, 24 by use of a strategy or algorithm which is illustrated in the state diagram 50 shown in FIG. 2. The strategy 50 uses a synchronous state machine to close the contactors 20, 24 and to monitor the energizing of the high voltage bus 12. The state machine executes in the controller 18, and in one non-limiting embodiment uses a time step of 10 milliseconds (ms).

Figure 3:
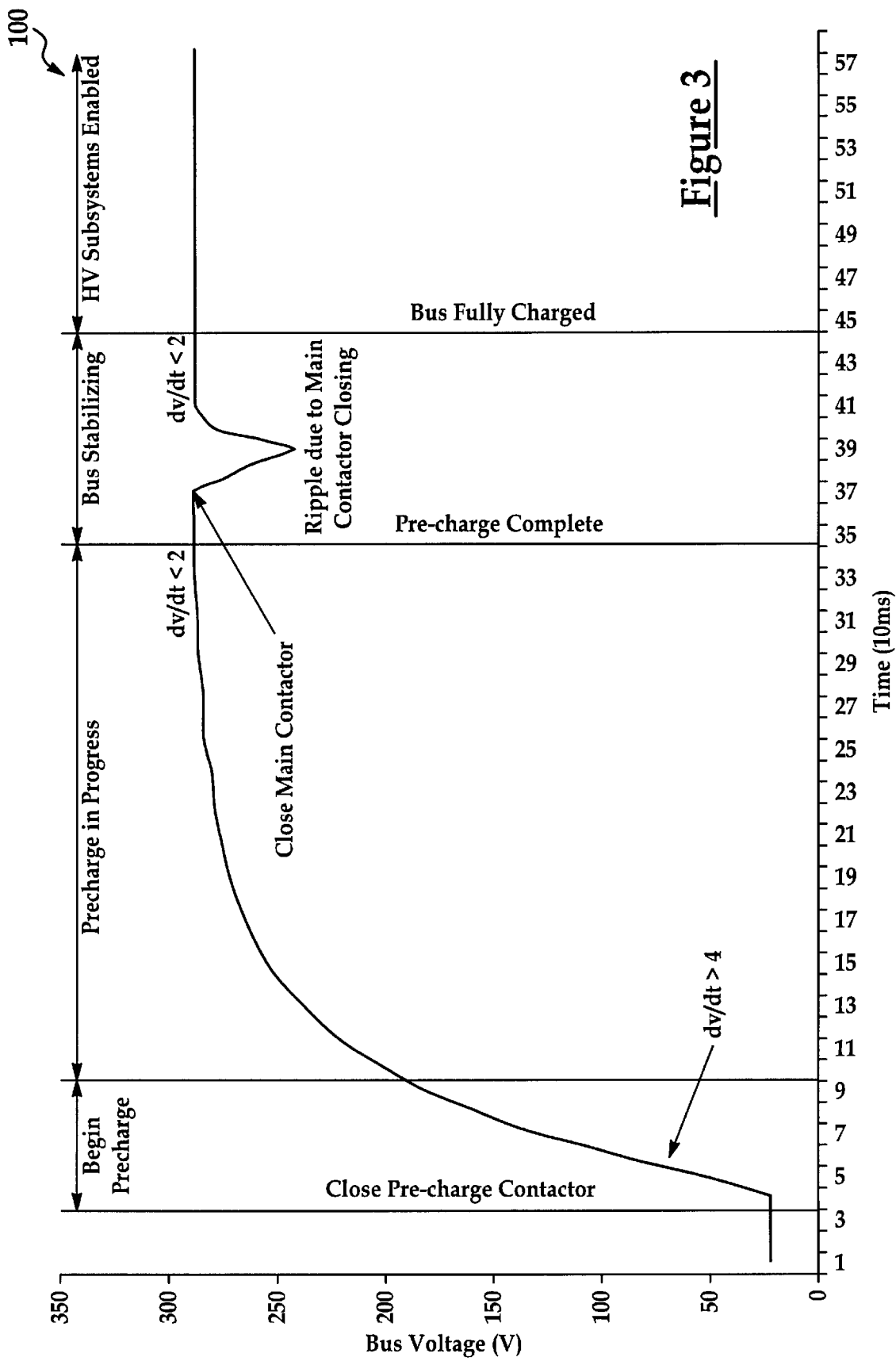
FIG. 3 is a graph of bus voltage versus time for a typical bus charging cycle.

The strategy 50 divides the energizing of the high voltage bus 12 into a predetermined sequence of events. The controller 18 then controls and tracks the events. This allows the controller 18 to immediately and accurately determine of the point of time when the high voltage bus 12 becomes stable and capable of powering motor 34 and high voltage vehicle components 36. The strategy 50 also captures error conditions, by identifying when the monitored charging sequence differs significantly from an "expected" or typical charging sequence. A graph 100 of bus voltage versus time for a typical or "expected" bus charging cycle is illustrated in FIG. 3.

The state machine algorithm 50 is divided into two main segments or cycles, a pre-charge contactor control segment 52 and a main contactor control segment 54. During the "pre-charging" segment or cycle, the bus voltage is rising rapidly as the high voltage bus' storage capacitors are being charged. When the bus voltage has risen to the potential of the battery 16, the main contactor 24 is closed in the "main charging" segment or cycle, and the bus 12 stabilizes.

Referring now to FIG. 2, there is shown a non-limiting embodiment of the state machine strategy 50 used by controller 18. It should be appreciated that all time and voltage values shown in the FIG. 2 are shown for purposes of clarity only, and can be modified or calibrated based on the characteristics of the vehicle 14, the power source 16 and/or the motor 34. Particularly, all voltage (V) and change in voltage over time (i.e., dv/dt) values may be set to any predetermined and calibratable values that are desirable or suitable based upon the attributes of vehicle 14 and power source 16.

The contactor-closing strategy 50 begins with the pre-charge segment 52. When the vehicle 14 is turned on (e.g., by use of the ignition key), controller 18 enters State 0, Begin Pre-Charge, and closes the pre-charge contactor 20. That is, controller 18 communicates a signal to contactor 20, effective to close the contactor 20. Controller 18 will transfer to State 1, Pre-Charge in Progress if the increase in voltage over bus 12 (i.e., dv/dt) exceeds 4 volts (V) for 50 milliseconds (ms) (i.e., if dv/dt>4V/50 ms). Controller 18 will also transfer to State 1 if the sensed bus voltage exceeds 200V. This addresses the case where the storage capacitors are still charged from a previous bus cycle. This condition would occur, by way of example and without limitation, when the vehicle 14 is started immediately after it has been shut off. If the change in voltage over time is less than 2 volts for 10 seconds (i.e., if dv/dt<2V/10 sec), controller 18 transfers to State 3, Pre-Charge fault, and a pre-charge error is declared. Particularly, in State 3, controller 18 ends the charging process (i.e., disconnects contactor 20) and issues an error notification to the vehicle system controller.

When controller 18 is in State 1, contactor 20 is closed and the bus voltage is rising to the voltage potential of the battery 16. The change in bus voltage over time (i.e., dv/dt) decreases as the bus voltage approaches the battery's potential. When the change in bus voltage over time becomes less than 2 volts for 50 ms (i.e., when dv/dt<2V/50 ms), control 18 enters State 2, Pre-Charge Complete.

In State 2, controller 18 checks the "final" pre-charge bus voltage by use of sensor 26. If the final pre-charge bus voltage is greater than 200 volts, controller 18 enters State 4, Close Main Contactor. If the final pre-charge bus voltage is not greater than 200 volts, controller 18 enters State 3 and declares a pre-charge fault. If controller 18 enters State 3 from State 2, a critical fault is declared, and bus charging is terminated (i.e., contactor 20 is opened). Upon entering State 3, controller 18 notifies the vehicle system controller of the fault. In order to "clear" such a critical fault, the vehicle 14 must be turned off and back on again (i.e., the vehicle's ignition switch must be moved to the "off" position and returned to the "run" or "start" position).

In State 4, controller 18 enters into the main contactor control segment 54 of the strategy 50 and closes the main current-carrying contactor 24. That is, controller 18 communicates a signal to contactor 24, effective to close the main contactor 24. In the preferred embodiment of the invention, after the main contactor 24 is closed, the pre-charge contactor is opened. If the main contactor 24 is successfully closed, controller 18 enters State 5. Particularly, if the measured bus voltage remains greater than 200 volts after the close of the main contactor 24, controller 18 enters State 5, Bus Stabilizing. If a condition is encountered which causes the bus voltage level to drop below 200 volts, a controller 18 transfers to State 7, Main Contactor Fault, and a main contactor fault is declared.

When the main contactor 24 closes, the motor 34 and the high voltage subsystems and accessories 36 are connected to the high voltage bus 12, which causes a fluctuation in the bus voltage level. In State 5, this fluctuation is allowed to stabilize. The change in voltage over time (i.e., dv/dt) decreases as the bus becomes stable. When the change in bus voltage over time falls below 2 volts for 50 ms (i.e., when dv/dt<2V/50 ms), controller 18 transfers to State 6, Bus Fully Charged.

In State 6, the "final" bus voltage is checked again. If the bus voltage exceeds 200 volts, the bus 12 is declared stable, and the motor 34 and high voltage vehicle subsystems 36 are operational. If the bus voltage is below 200 volts, a transition to State 7 occurs, and a main contactor fault is declared.

In State 7, controller 18 declares a critical fault and terminates the bus charging procedure. Particularly, in State 7, controller 18 ends the charging process (i.e., disconnects contactor 24) and issues an error notification to the vehicle system controller. In order to "clear" such a critical fault, the vehicle 14 must be turned off and back on again (i.e., the vehicle's ignition switch must be moved to the "off" position and returned to the "run" or "start" position).

The state machine strategy 50 of the present invention provides significant advantages over prior bus-charging schemes. Since the change in bus voltage over time (i.e., dv/dt) is monitored in both the pre-charge cycle 52 and main closing cycle 54, the time required for the bus voltage to "stabilize" is shortened considerably. This is because the present system requires no fixed "buffer" time. When the pre-charge sequence is completed, the state machine transfers from State 1, Pre-charge in Progress to State 2, Pre-charge Complete as soon as dv/dt<2V/50 ms. Likewise, when the main contactor is closed, the state machine transfers from State 5, Bus Stabilizing to State 6, Bus Fully Charged as soon as dv/dt<2V/ms.

With the state machine strategy 50, no buffer zone is needed between the transitions, since the state itself acts as a buffer zone. The state transition does not occur until the bus is stable. However, the state transition occurs as soon as the bus is stable. The result is that the bus is declared stable as soon as possible. This takes into account different conditions, such as battery state-of-charge and available source current. The state machine will always declare bus stability in the least amount of time for a given set of vehicle conditions.

During testing of a conventional hybrid electric vehicle, the inventor has found that the time from when the vehicle's ignition switch was turned to the "run" position to the time when the vehicle's high voltage bus was operational was reduced to 450 ms using the state machine strategy 50. This represented a significant improvement, with a reduction in charge time of 34% over the prior charging scheme.

The state machine design offers the advantage of being able to accurately determine which stage of the charge cycle the bus is in, and when the next stage has been entered. This close tracking of the bus voltage while charging will result in the fastest determination of bus stability. This in turn will shorten the time from the vehicle's ignition switch being turned to the "run" position to the point when the vehicle is fully operational. The system 10 has performed well and has proved to be both robust and reliable, taking into account differing vehicle configurations.

It is understood that the invention is not limited by the exact construction or method illustrated and described above, but that various changes and/or modifications may be made without departing from the spirit and/or the scope of the inventions.

What is claimed is:

1. A system for charging a high voltage bus within a vehicle, said system comprising:

a source of electrical power;

a pre-charge contactor coupled to said source of electrical power and to said high voltage bus for selectively and operatively connecting said high voltage bus to said source of electrical power;

a main contactor coupled to said source of electrical power and to said high voltage bus for selectively and operatively connecting said high voltage bus to said source of electrical power;

a voltage sensor for measuring a voltage of said high voltage bus and for generating signals in response to said measured voltage; and a controller communicatively coupled to said pre-charge contactor, to said main contactor and to said voltage sensor, said controller being effective to receive said signals and to use said signals to calculate a voltage of said high voltage bus and a change in the voltage over time of said high voltage bus, said controller being further effective to utilize said calculated voltage and said calculated change in voltage over time within a state machine strategy, the state machine strategy having a pre-charge cycle wherein said pre-charge contactor is closed and a main charging cycle wherein said main contactor is closed, and wherein said controller transfers from said pre-charge cycle to said main charging cycle if said calculated voltage exceeds a first predetermined value and said calculated change in voltage over time is less than a second predetermined value.

2. The system of claim 1 wherein said pre-charge contactor is disposed in a parallel relationship with said main contactor.

3. The system of claim 1 wherein said pre-charge contactor comprises a relay.

4. The system of claim 1 wherein said main contactor comprises a relay.

5. The system of claim 1, wherein said controller determines that said vehicle is operational only if said state machine strategy is in said main charging cycle and said calculated voltage exceeds a third predetermined value and said calculated change in voltage over time is less than a fourth predetermined value.

6. The system of claim 5 wherein said third predetermined value is approximately 200 volts.

7. The system of claim 6 wherein said fourth predetermined value is approximately 2 volts for 50 milliseconds.

8. The system of claim 1, wherein said first predetermined value is approximately 200 volts.

9. The system of claim 8 wherein said second predetermined value is approximately 2 volts for 50 milliseconds.

10. A method for charging a high voltage bus of a vehicle, comprising:
monitoring a voltage of said high voltage bus;
monitoring a change in the voltage over time of said high voltage bus;
using the monitored voltage and the monitored change in voltage over time to close a pre-charge contactor during a pre-charge cycle of a state machine strategy and to close a main contactor during a main charging cycle of the state machine strategy; and
transitioning from the pre-charge cycle to the main charging cycle if the monitored voltage exceeds a first predetermined value and the monitored change in voltage over time is less than a second predetermined value.

11. The method of claim 10, further comprising the step of determining that said high voltage bus is fully charged and said vehicle is operational only if said state machine strategy is in said main charging cycle and said monitored voltage exceeds a third predetermined value and said monitored change in voltage over time is less than a fourth predetermined value.

12. A method for charging a high voltage bus within a vehicle including a source of electrical power and a pre-charge contactor and a main contactor which selectively connect said source of electrical power to said high voltage bus, said method comprising the steps of:
closing said pre-charge contactor, effective to connect said high voltage bus to said source of electrical power;
monitoring the voltage of said high voltage bus;
monitoring the change in voltage over time of said high voltage bus;
determining whether the change in voltage over time of said high voltage bus exceeds a first predetermined value and whether the voltage of said high voltage bus exceeds a second predetermined value;
proceeding to a first state if the change in voltage over time of said high voltage bus exceeds the first predetermined value or if the voltage of said high voltage bus exceeds the second predetermined value;
determining whether the change in voltage over time of said high voltage bus is less than a third predetermined value in the first state;
proceeding to a second state if the change in voltage over time of said high voltage bus is less than the third predetermined value in the first state;
determining whether the voltage of the high voltage bus exceeds a fourth predetermined value in the second state;
proceeding to a third state if the voltage of the high voltage bus does not exceed the fourth predetermined value in the second state, and opening the pre-charge contactor in the third state, thereby terminating the charging of said high voltage bus;
proceeding to a fourth state if the voltage of the high voltage bus exceeds the fourth predetermined value in the second state, and closing the main contactor in the fourth state;
determining whether the bus voltage is greater than a fifth predetermined value in the fourth state;
proceeding to a fifth state if the voltage of the high voltage bus exceeds the fifth predetermined value in the fourth state;
determining whether the change in voltage over time is less than a sixth predetermined value in the fifth state;
proceeding to a sixth state if the change in voltage over time is less than the sixth predetermined value in the fifth state;
determining whether the voltage of the high voltage bus exceeds a seventh predetermined value in the sixth state;
proceeding to a seventh state if the voltage of the high voltage bus does not exceed the fourth predetermined value in the second state, and terminating the charging of said high voltage bus in the seventh state; and
determining that said high voltage bus is fully powered and operational if the voltage of said high voltage bus exceeds said seventh predetermined value in said sixth state.

13. The method of claim 12 wherein said second, fourth, fifth and seventh predetermined values are all approximately equal.

14. The method of claim 12 wherein said second, fourth, fifth and seventh predetermined values are each approximately equal to 200 volts.

15. The method of claim 12 wherein said third and sixth predetermined values are approximately equal.

16. The method of claim 15 wherein said third and sixth predetermined values are approximately equal to 2 volts for 50 milliseconds.

* * * * *